United States Patent [19]

Morgan et al.

[11] Patent Number: 5,680,310
[45] Date of Patent: Oct. 21, 1997

[54] METHOD AND APPARATUS FOR SENSING A STEADY STATE ENGINE CONDITION USING A TRENDING ALGORITHM

[75] Inventors: Stephen G. Morgan, Bristol; Michael J. Provost, Nottingham, both of England

[73] Assignee: Rolls-Royce plc, London, England

[21] Appl. No.: 498,869

[22] Filed: Jul. 6, 1995

[30] Foreign Application Priority Data

Jul. 9, 1994 [GB] United Kingdom .................... 9413986

[51] Int. Cl.$^6$ .................................................. G06F 17/00
[52] U.S. Cl. ................. 364/431.01; 364/431.02; 364/551.01; 73/117.3
[58] Field of Search .................... 364/431.03, 431.04, 364/431.07, 431.12, 431.01, 550, 551.01, 431.02; 73/117.2, 117.3

[56] References Cited

U.S. PATENT DOCUMENTS

| | | | |
|---|---|---|---|
| 4,467,640 | 8/1984 | Morrison | 73/117.3 |
| 4,541,052 | 9/1985 | McCulloch | 364/431.07 |
| 4,575,803 | 3/1986 | Moore | 364/550 |
| 4,763,285 | 8/1988 | Moore et al. | 364/551.01 |
| 4,787,053 | 11/1988 | Moore | 364/551.01 |
| 4,931,963 | 6/1990 | Kimura et al. | 364/551.01 |
| 5,012,422 | 4/1991 | Takahashi et al. | 364/431.054 |
| 5,056,491 | 10/1991 | Tsukamoto | 123/492 |
| 5,337,868 | 8/1994 | Liu et al. | 477/74 |

FOREIGN PATENT DOCUMENTS

| | | |
|---|---|---|
| 0 0173 093 | 3/1988 | European Pat. Off. . |
| 0 286 120 | 10/1988 | European Pat. Off. . |
| 0 327 865 | 8/1989 | European Pat. Off. . |
| 36 33 402 A1 | 4/1987 | Germany . |
| 36 39 755 A1 | 5/1987 | Germany . |
| 42 34 210 A1 | 4/1994 | Germany . |

*Primary Examiner*—Collin W. Park
*Attorney, Agent, or Firm*—Oliff & Berridge

[57] ABSTRACT

In operation of an engine it is desirable to be able to keep track of engine condition by measuring the values of various engine parameters such as temperatures and pressures and seeing how the relationship between them change. This must be done while the engine is in a steady state condition, generally this requires that the engine be in a cruise condition for some time but this is impractical for military aircraft. It is suggested that each of the sense parameter values be operated on by a trending algorithm which generates a trend estimate which provides a measure of the rate of change of the parameter value. When all of the parameters have trend values are below some pre-set value the engine condition is taken to be at least temporarily steady state condition and parameter values recorded for later analysis.

8 Claims, 1 Drawing Sheet

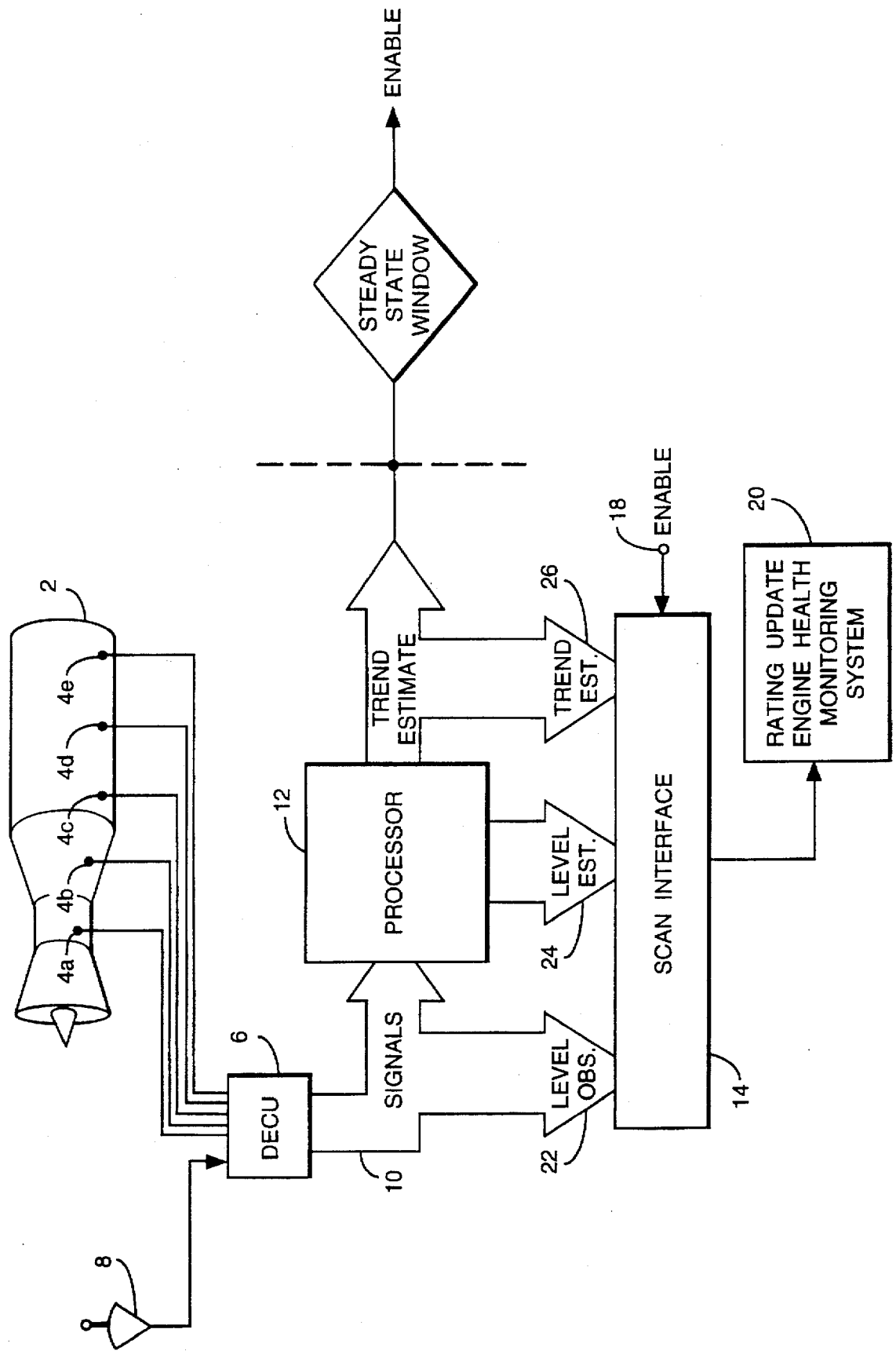

METHOD AND APPARATUS FOR SENSING A STEADY STATE ENGINE CONDITION USING A TRENDING ALGORITHM

BACKGROUND OF THE INVENTION

The present invention relates to a method of monitoring the condition of an aeroengine. More particularly, the invention concerns sensing steady states of signals which monitor the operation of a gas turbine aeroengine in order to provide an assessment of the state of wear of the engine.

In the operation and maintenance of gas turbine engines it is desirable to keep a check of engine condition so that fuel consumption and power output can be maintained at acceptable levels. Thereby, failures due to wear or damage can be predicted and avoided. This is done by measuring a number of engine operating parameters. They may be compared with datum values or with previous recorded values, so the changes in the relative values of the parameters can be used to deduct the current engine condition. Typical parameters monitored are engine shaft RPM, various temperatures and pressures at several points within the engine.

In order for the conclusions reached to have any validity, the measurements are taken when the engine is settled into a steady running state. The relative values of the parameters can alter radically when the engine state is changing, thereby rendering invalid conclusions based on transient states.

Long haul commercial aircraft engines may run for several hours at a single cruise power setting allowing ample time for them to settle to steady states. However, for short haul commercial aircraft and on some military aircraft flights, engine power settings are changed too frequently for an engine to settle into a steady state on a normal flight. The engines are then often run specially on the ground in order to assess their condition. This need for special test running is costly, time consuming and is clearly undesirable.

SUMMARY OF THE INVENTION

The present invention is intended to overcome these drawbacks by providing a method of using available engine parameter information without running the engines for long periods.

In its broadest aspect the present invention provides a method of determining engine condition employing a trending algorithm to generate an estimate of steady state parameter values on the basis of available transient parameter information.

According to the invention, there is provided a method of monitoring the condition of an engine instrumented with a number of transducers for sensing a plurality of engine parameters, characterised by:

measuring the output values of the engine parameter transducers;

calculating instantaneous rates of change of said transducer output values;

comparing each said calculated rate of change with a corresponding parameter threshold value to determine when the engine has reached or is close to a steady operating state; and in response to positive identification of a steady state or near steady state to record the output values of the engine parameter transducers.

Preferably the step of comparing a calculated rate of change with a threshold value to identify a deemed steady state condition is executed in accordance with a trending algorithm.

BRIEF DESCRIPTION OF THE DRAWING

The single FIGURE of the drawing illustrates a computer processor based engine condition monitoring system.

DESCRIPTION OF THE PREFERRED EMBODIMENTS

In the preferred example, described below, the trending algorithm operates according to the formula:

$$Trend = Old\ Trend + ((K^2/(2-K)) \times Delta)$$

wherein

Delta=Obs−Old Level−Old Trend

Old Level=Level estimate on previous cycle

Level=Level estimate

Old Trend=Trend estimate on previous cycle

Trend=Trend estimate, and

Level=Old Level+Old Trend+(K×Delta)

K=A Constant

Obs=Observed parameter value

Each of the engine parameters measured is processed using this algorithm to produce an indicator of the rate at which the parameter value is changing.

The first time differential is used to detect periods in which the rate of change of a parameter is zero.

When all of the parameters simultaneously have a zero first differential for a finite period, the engine is in a steady state. Of course the rates of change are unlikely ever to be precisely zero, so the engine is deemed to be in steady state when all the first differential values are below some threshold value. When the engine is in such a state the engine parameter values are recorded. These recorded parameter values can then be used later to deduce the engine condition.

There will be an inherent and unavoidable error because the first differentials of the parameter values were not exactly zero. However, the magnitude of these errors can be minimised by setting appropriate threshold values and sample times.

A recursive algorithm of the form mentioned above in the present example is used to perform the trending operation. Essentially the algorithm comprises the following three equations:

$$Delta = Obs - Old\ Level - Old\ Trend \quad (1)$$

$$Level = Old\ Level + Old\ Trend + (K \times Delta) \quad (2)$$

$$i\ Trend = Old\ Trend + ((K^2/(2-K)) \times Delta) \quad (3)$$

Where Obs=Observed parameter value

Level=Level estimate

Old Level=Level estimate on last cycle

Trend=Trend estimate

Old Trend=Trend estimate on last cycle

K=A constant

Delta=Degree of prediction error.

All three equations (1), (2) and (3) are calculated on each recursive cycle using the new observed parameter value and level and trend estimates from the last cycle. Clearly equation (1), to calculate a "Delta" value, must be evaluated first.

On start up, the system is initialised with the assumption that the "old Level" value is equal to the measured value "Obs" and that the "Old Trend" value is a small constant, usually zero.

The engine parameter values may indicate stability temporarily while the engine is in a part of its operating envelope where performance monitoring cannot be usefully carried out. In this case a decision not to record parameter values may be made. If an inhibit is not applied to the recording process it should be made only when the actual parameter values are within predetermined acceptable ranges and temporary stability is indicated. This comparison step can be made at any convenient stage in the cyclic process. For greatest efficiency it is preferably made before steps are taken to evaluate the algorithm. If the parameters are not within the recording limits, any calculation of the rates of change is wasted.

By way of example only, the single figure of the drawing illustrates in block diagram form a computer processor based engine condition monitoring system. In the drawing, a gas turbine engine shown schematically at 2 is instrumented with a plurality of sensors or transducers indicated at 4a, 4b, 4c, 4d and 4e. These sensors or transducers monitor a number of variable parameters such as, for example: pressure, temperature, nozzle position, fuel flow rate etc. Typically an engine control system receives inputs from various sensors such as those mentioned, in order to evaluate normal engine control functions. The present proposal involves making further use of some, at least, of these variables to diagnose the "state of health" of the engine. It will be understood, therefore, that it is not suggested here that additional sensors or transducers are needed to perform the invention. On the other hand, the possibility is not hereby excluded.

In the engine upon which this example is based, among the parameters monitored and employed to assess the state of health of the engine are the following:

P2—Compressor delivery pressure
T2—Compressor delivery temperature
NH—High pressure spool speed (a two spool engine)
NL—Low pressure spool speed
PLD—Pilot's Lever (Throttle) Demand
PIGV—Position of Guide Vanes at Combustor Inlet
PS3—Turbine Stage Entry Pressure
TBT—Turbine Temperature Another parameter supplied to DECU 6 is a speed control signal or thrust lever angle signal (PLD) generated by the pilot's cockpit mounted thrust lever 8.

Other parameters may be used, and the above list is not intended to be exhaustive. Furthermore these parameters are those normally employed in the digital engine control unit 6 (DECU) to control engine operation.

The DECU 6 in question comprises two parallel redundant systems which receive the same inputs, perform the same control functions, and produce independent outputs which are compared to yield the final output. In the event of the two DECU channels disagreeing, one of the outputs is disregarded. Such a situation would arise if one of the channels developed a fault. Then fault analysis is carried out in a normal manner to identify and isolate the faulty channel. Note that for the purposes of the present explanation of the engine monitoring system, DECU control outputs are not of interest and have been omitted from the accompanying drawing for clarity.

The mentioned signals which describe the state of the engine are supplied by DECU 6 via a data highway 10 to a processor 12 and in parallel to a scan interface unit 14. The observed signals on highway 10 are processed cyclically by processor 12 using the above mentioned algorithm to generate the level estimate and trend estimate signals. It is convenient to synchronise processor operation with DECU operation and to process the observed signals once each major DECU cycle. Other processing DECU cycles are once per signal sample if this is different.

When a stable signal window is identified, that is when each of the signals remains at a steady value, within predetermined tolerances for a predetermined period of time, then an Enable Signal is generated and applied to scan interface enable input 18. This triggers the scan interface circuits 14 to sample the selected interface input signals and pass them, ie read them into the Engine Health Monitoring system recording unit 20. These selected interface inputs comprise the observed levels 22, level estimates 24, and trend estimates 26 for all signals. The "scanned" signals may be read into the EMM system 20 either serially or in parallel.

We claim:

1. A method of monitoring the condition of an engine instrumented with a number of transducers that sense a plurality of engine parameters, comprising:

measuring the output values of the engine parameter transducers;

calculating instantaneous rates of change of said transducer output values;

comparing each said calculated rate of change with a corresponding parameter threshold value in order to determine when the engine has reached or is close to a steady operating state;

wherein the step of comparing said values is executed in accordance with a trending algorithm according to the formula:

$$Trend=Old\ Trend+(K^2/(2-K)\times Delta),$$

wherein

Delta=Obs−Old Level−Old Trend,
Old Level=Level estimate on previous cycle,
Level=Level estimate,
Old Trend=Trend estimate on previous cycle,
Trend=Trend estimate,
Level=Old Level+Old Trend+(K×Delta),
K=A Constant, and
Obs=Observed parameter value.

2. A method according to claim 1, further comprising recording the output values of the engine parameter transducers when it is determined that the engine has reached or is close to the steady operating state.

3. A method according to claim 1, wherein at least one of the monitored engine parameters includes a temperature within a portion of the engine.

4. A method according to claim 1, wherein at least one of the monitored engine parameters includes a pressure within a portion of the engine.

5. A method according to claim 1, wherein at least one of the monitored engine parameters includes a position of a nozzle within the engine.

6. A method according to claim 1, wherein at least one of the monitored engine parameters includes a fuel flow rate of the engine.

7. A method according to claim 1, wherein at least some of the monitored engine parameters include a temperature and a pressure within a portion of the engine, a position of a nozzle within the engine and a fuel flow rate of the engine.

8. Apparatus for monitoring the condition of an engine comprising:

a plurality of transducers attached at points on the engine to sense a plurality of engine parameters;

means for periodically capturing the output values of the engine parameter transducers;

a processor including:

means for calculating instantaneous rates of change of the transducer output values;

means for comparing each said calculated rate of change with a corresponding parameter threshold value to determine when the engine has reached or is close to a steady operating state, said means for comparing executing a trending algorithm according to the formula:

$$Trend = Old\ Trend + (K^2/(2-K) \times Delta),$$

wherein

Delta=Obs−Old Level−Old Trend,

Old Level=Level estimate on previous cycle,

Level=Level estimate,

Old Trend=Trend estimate on previous cycle,

Trend=Trend estimate,

Level=Old Level+Old Trend+(K×Delta),

K=A Constant, and

Obs=Observed parameter value;

means for producing an output control signal in response to identification of an engine steady state; and means responsive to said output control signal for recording the output values of the engine parameter transducers.

* * * * *